(12) United States Patent
Manabe et al.

(10) Patent No.: US 10,914,233 B2
(45) Date of Patent: Feb. 9, 2021

(54) COMBINED POWER GENERATION SYSTEM COMPRISING A FUEL CELL AND A GAS TURBINE ENGINE

(71) Applicant: Mitsubishi Hitachi Power Systems, Ltd., Kanagawa (JP)

(72) Inventors: So Manabe, Tokyo (JP); Kentaro Fujii, Tokyo (JP)

(73) Assignee: MITSUBISHI POWER, LTD., Kanagawa (JP)

(*) Notice: Subject to any disclaimer, the term of this patent is extended or adjusted under 35 U.S.C. 154(b) by 215 days.

(21) Appl. No.: 16/138,341

(22) Filed: Sep. 21, 2018

(65) Prior Publication Data

US 2019/0024580 A1 Jan. 24, 2019

Related U.S. Application Data

(62) Division of application No. 14/437,338, filed as application No. PCT/JP2013/079923 on Nov. 5, 2013, now Pat. No. 10,107,190.

(30) Foreign Application Priority Data

Nov. 21, 2012 (JP) ................................ 2012-255703
Feb. 19, 2013 (JP) ................................ 2013-030336

(51) Int. Cl.
*F02C 6/10* (2006.01)
*F02C 6/00* (2006.01)
(Continued)

(52) U.S. Cl.
CPC .................. *F02C 6/10* (2013.01); *F02C 6/00* (2013.01); *F02C 9/40* (2013.01); *F23R 3/346* (2013.01);
(Continued)

(58) Field of Classification Search
CPC ....... H01M 8/04111; H01M 2250/402; H01M 2250/407; F02C 3/36; F02C 3/365;
(Continued)

(56) References Cited

U.S. PATENT DOCUMENTS 3,481,145 A 12/1969 Oldfield
4,503,666 A 3/1985 Christoff
(Continued)

FOREIGN PATENT DOCUMENTS

CN 87 1 03747 12/1987
CN 102449835 5/2012
(Continued)

OTHER PUBLICATIONS

Office Action dated Jun. 6, 2018 in German Application No. 11 2013 005 578.3, with English translation.
(Continued)

*Primary Examiner* — William H Rodriguez
(74) *Attorney, Agent, or Firm* — Wenderoth, Lind & Ponack, L.L.P.

(57) ABSTRACT

In a power generation system, exhausted fuel gas exhausted from a solid oxide fuel cell (SOFC) is used as a fuel of a first combustor or a second combustor of a gas turbine, and at the same time, a part of compressed air compressed by a compressor of the gas turbine is used to drive the SOFC. The gas turbine includes the first combustor for burning fuel gas which is different from the exhausted fuel gas, a first turbine configured to be driven by combustion gas supplied from the first combustor, the second combustor for burning at least a part of the exhausted fuel gas, and a second turbine coupled with the first turbine and configured to be driven by combustion gas supplied from the second combustor.

2 Claims, 6 Drawing Sheets

(51) Int. Cl.
    *F02C 9/40* (2006.01)
    *F23R 3/36* (2006.01)
    *F23R 3/34* (2006.01)
    *F02C 7/22* (2006.01)
    *F02C 3/107* (2006.01)
    *F02C 6/18* (2006.01)

(52) U.S. Cl.
    CPC ............... *F23R 3/36* (2013.01); *F02C 3/107* (2013.01); *F02C 6/18* (2013.01); *F02C 7/22* (2013.01); *F23R 2900/03341* (2013.01); *H01M 2250/407* (2013.01)

(58) Field of Classification Search
    CPC ...... F02C 6/00; F02C 6/10; F02C 6/18; F02C 7/22; F02C 7/26; F02C 9/26; F02C 9/40; F23R 3/286; F23R 3/36; F23R 2900/03341
    See application file for complete search history.

(56) References Cited

U.S. PATENT DOCUMENTS

| | | | |
|---|---|---|---|
| 4,753,077 A | 6/1988 | Rosenblatt | |
| 4,817,389 A | 4/1989 | Holladay et al. | |
| 5,678,647 A * | 10/1997 | Wolfe | H01M 8/04014 429/430 |
| 5,968,680 A * | 10/1999 | Wolfe | H01M 8/04302 429/425 |
| 6,255,010 B1 * | 7/2001 | George | H01M 8/04089 429/434 |
| 6,585,785 B1 * | 7/2003 | Warren | B01J 8/001 422/107 |
| 6,868,677 B2 * | 3/2005 | Viteri | H01M 8/0662 60/784 |
| 7,966,830 B2 * | 6/2011 | Daggett | B64D 27/02 60/780 |
| 9,638,102 B2 * | 5/2017 | Kobayashi | H01M 8/04111 |
| 9,777,629 B2 * | 10/2017 | Nakamoto | F02C 3/30 |
| 9,979,033 B2 * | 5/2018 | Manabe | F02C 3/04 |
| 10,107,190 B2 * | 10/2018 | Manabe | H01M 8/04111 |
| 10,490,832 B2 * | 11/2019 | Manabe | H01M 8/04111 |
| 2002/0146604 A1 * | 10/2002 | Matoba | H01M 8/04225 429/423 |
| 2005/0079462 A1 * | 4/2005 | Sennoun | F23D 11/402 431/243 |
| 2006/0101814 A1 * | 5/2006 | Saitoh | F23R 3/343 60/377 |
| 2006/0222919 A1 * | 10/2006 | Tanaka | H01M 8/04022 429/414 |
| 2011/0016873 A1 * | 1/2011 | Nakamura | F02C 9/34 60/772 |
| 2011/0053023 A1 * | 3/2011 | Johansen | H01M 8/04776 429/429 |
| 2011/0162341 A1 | 7/2011 | Parry | |
| 2012/0083387 A1 * | 4/2012 | Turner | F02C 6/10 477/5 |
| 2014/0230450 A1 * | 8/2014 | Ozawa | F02C 9/40 60/780 |
| 2014/0318146 A1 * | 10/2014 | Kobayashi | F01K 23/101 60/783 |
| 2015/0064583 A1 * | 3/2015 | Nagai | H01M 8/04097 429/415 |
| 2015/0288009 A1 * | 10/2015 | Manabe | H01M 8/04111 429/446 |
| 2015/0295256 A1 * | 10/2015 | Nakamoto | H01M 8/04302 429/429 |
| 2015/0303496 A1 * | 10/2015 | Nakamoto | H01M 8/0435 429/414 |
| 2015/0345386 A1 * | 12/2015 | Nakamoto | F02C 6/18 60/801 |
| 2016/0126570 A1 * | 5/2016 | Nagai | H01M 8/04303 137/560 |
| 2018/0212261 A1 * | 7/2018 | Manabe | H01M 8/04089 |

FOREIGN PATENT DOCUMENTS

| | | |
|---|---|---|
| EP | 2 075 440 | 7/2009 |
| JP | 49-12722 | 3/1974 |
| JP | 8-210641 | 8/1996 |
| JP | 11-343869 | 12/1999 |
| JP | 2002-106844 | 4/2002 |
| JP | 2004-60574 | 2/2004 |
| JP | 2005-38817 | 2/2005 |
| JP | 2006-144759 | 6/2006 |
| JP | 2008-166070 | 7/2008 |
| JP | 2008-251247 | 10/2008 |
| JP | 2009-205930 | 9/2009 |
| JP | 2011-74803 | 4/2011 |
| JP | 2012-41882 | 3/2012 |
| JP | 2012-522173 | 9/2012 |

OTHER PUBLICATIONS

Notice of Allowance dated Dec. 16, 2016 in Korean Application No. 10-2015-7010271, with English translation.
Notice of Allowance dated Jan. 12, 2017 in Chinese Application No. 201380055541.8, with English translation.
Notice of Allowance dated Oct. 14, 2016 in Korean Application No. 10-2016-7020727, with partial English translation.
Decision of a Patent Grant dated Aug. 9, 2016 in Japanese Application No. 2012-255703, with English translation.
Decision of a Patent Grant dated Jul. 5, 2016 in Japanese Application No. 2013-030336, with English translation.
Office Action dated May 31, 2016 in Japanese Application No. 2012-255703, with English translation.
Office Action dated Dec. 22, 2015 in Chinese Application No. 201380055541.8, with English translation.
Written Opinion of the International Searching Authority dated Jan. 14, 2014 in International (PCT) Application No. PCT/JP2013/079923.
International Search Report dated Jan. 14, 2014 in International (PCT) Application No. PCT/JP2013/079923.

* cited by examiner

FIG.2

| | | DRIVE FIRST TURBINE | DRIVE STEAM TURBINE | START PRESSURIZATION ON SOFC | EQUALIZE PRESSURES | COMPLETE PRESSURIZATION ON SOFC | SOFC REACTION IS STABILIZED (DRIVE SOFC) | DRIVE SECOND TURBINE |
|---|---|---|---|---|---|---|---|---|
| FIRST FUEL GAS CONTROL VALVE 28 | OPENED / CLOSED | ___/‾‾ | | | | | | |
| FIRST COMPRESSED AIR CONTROL VALVE 29 | OPENED / CLOSED | ___/‾‾ | | | | | | ‾‾\___ |
| WATER SUPPLY PUMP 57 | DRIVEN / STOPPED | | ___/‾‾ | | | | | |
| COMPRESSED AIR EXHAUST CONTROL VALVE 37 | OPENED / CLOSED | | | | | ‾‾\___ | | |
| COMPRESSED AIR CIRCULATION CONTROL VALVE 38 | OPENED / CLOSED | | | | | | | ‾‾\___ |
| COMPRESSED AIR BLOWER 33 | DRIVEN / STOPPED | | | | | ___/‾‾ | | |
| SECOND COMPRESSED AIR CONTROL VALVE 32 | OPENED / CLOSED | | | | ___/‾‾ | | | |
| EXHAUSTED FUEL GAS EXHAUST CONTROL VALVE 46 | OPENED / CLOSED | | | | | ‾‾\___ | | |
| EXHAUSTED FUEL GAS CONTROL VALVE 47 | OPENED / CLOSED | | | | | | | ___/‾‾ |
| EXHAUSTED FUEL GAS BLOWER 48 | DRIVEN / STOPPED | | | | | | | ___/‾‾ |
| SECOND FUEL GAS CONTROL VALVE 42 | OPENED / CLOSED | | | | ___/‾‾ | | | |
| RE-CIRCULATION BLOWER 50 | DRIVEN / STOPPED | | | | ___/‾‾‾\___ | | | |
| CONNECTING/ DISCONNECTING UNIT 60 | CONNECTED / DISCONNECTED | | | | | | | ‾‾\___ |
| FIRST COMPRESSED AIR BRANCH CONTROL VALVE 30 | OPENED / CLOSED | | | | | | | ___/‾‾ |

COMBINED POWER GENERATION SYSTEM COMPRISING A FUEL CELL AND A GAS TURBINE ENGINE

FIELD

The present invention relates to a power generation system in which a fuel cell, a gas turbine, and a steam turbine are combined, a driving method for the power generation system, and a combustor.

BACKGROUND

A solid oxide fuel cell (referred to as SOFC below) as a fuel cell has been known as a general-purpose and high-efficiency fuel cell. Since an operating temperature of the SOFC is set to be high to increase an ion conductivity, compressed air discharged from a compressor of the gas turbine can be used as air (oxidant) supplied to a side of an air electrode. Also, high-temperature exhausted fuel gas exhausted from the SOFC can be used as a fuel of the combustor of the gas turbine.

Therefore, for example, as described in Patent Literature 1, various power generation systems in which the SOFC, the gas turbine, and the steam turbine are combined have been proposed as a power generation system which can achieve a high-efficiency power generation. In a combined system described in Patent Literature 1, the gas turbine includes a compressor for compressing air and supplying it to the SOFC and a combustor for generating combustion gas from the exhausted fuel gas exhausted from the SOFC and the air.

For example, Patent Literature 2 discloses a fuel cell system including a combustor for burning exhausted fuel gas to be exhausted from a fuel cell. The combustor includes a primary combustion chamber and a secondary combustion chamber. The exhausted fuel gas from the fuel cell is jetted from a burner, and the primary combustion chamber performs primary combustion of the exhausted fuel gas by using primary air. The secondary combustion chamber is connected to the primary combustion chamber via a communication passage having a gas passage narrower than the primary combustion chamber and performs secondary combustion of the gas from the primary combustion chamber by using secondary air. The burner includes triple blowoff port. In the triple blowoff ports, a torch flame blowoff port for jetting an ignition torch flame is arranged at the center, and an annular exhausted fuel blowoff port for jetting the exhausted fuel gas is arranged outside the torch flame blowoff port. Also, a circular exhausted air blowoff port for jetting exhausted air to outside the exhausted fuel blowoff port is concentrically arranged. The burner also includes a plurality of auxiliary fuel blowoff ports, which passes through the exhausted air blowoff port and jets the auxiliary fuel, in the exhausted air blowoff port.

Also, for example, Patent Literature 3 discloses a fuel supply method for the combustor for supplying at least two kinds of fuels having different calories from each other to the combustor. At the time of starting operation of the gas turbine, a high calorie fuel and low calorie fuel are supplied to the combustor by using both a first fuel supply system for supplying the high calorie fuel to a first nozzle included in the combustor and a second fuel supply system for supplying the low calorie fuel to a second nozzle included in the combustor. When an output of the gas turbine reaches the output which can realize continuous operation with the low calorie fuel, the supply of the high calorie fuel to the combustor is interrupted, and the low calorie fuel is supplied to the combustor.

CITATION LIST

Patent Literature

Patent Literature 1: Japanese Laid-open Patent Publication No. 2009-205930
Patent Literature 2: Japanese Laid-open Patent Publication No. 2008-166070
Patent Literature 3: Japanese Laid-open Patent Publication No. 2012-41882

Technical Problem

In a power generation system described in the above-mentioned Patent Literature 1, a gas turbine is driven by combustion gas generated by burning exhausted fuel gas exhausted from a SOFC and compressed air in a combustor. On the other hand, the SOFC generates power by using supplied fuel gas and compressed air compressed by a compressor and exhausts the exhausted fuel gas and the compressed air used to generate the power to the gas turbine. Therefore, after the gas turbine has been driven first, the SOFC is driven by supplying the compressed air thereto.

In the power generation system described in the above-mentioned Patent Literature 1, the combustor for supplying the combustion gas to the gas turbine needs the fuel gas because the exhausted fuel gas is not supplied in a state where the SOFC is not operated. Also, when the exhausted fuel gas from the SOFC is used as a fuel, it is necessary for the combustor to supplement the heat input by supplying the fuel gas with high calorie in a case where the heat input is lacked relative to the heat input in which the gas turbine reaches the rated load. In this way, when the power generation system in which the SOFC, the gas turbine, and the steam turbine are combined is operated, fuels to be supplied to the combustor become different kinds from each other, such as the exhausted fuel gas and the fuel gas, according to the operation state of the SOFC and the gas turbine.

Generally, it is preferable to use a mixer to burn different kinds of fuel gases in the combustor. However, the exhausted fuel gas exhausted from the SOFC reaches about 400° C., and the fuel gas to supplement the heat input is about 15° C. The temperatures differ from each other. Therefore, there is a possibility that the respective fuel gases are not evenly mixed due to the difference in temperature and the combustion becomes unstable in the mixer. Also, it becomes necessary to take measures against thermal expansion in the mixer and piping around the mixer due to the difference in temperature.

SUMMARY

The present invention is to solve the above-mentioned problems. A purpose of the present invention is to provide a power generation system and a driving method for the power generation system which can solve inconvenience caused by a difference in temperature of the different kinds of fuel gases.

The present invention is to solve the above-mentioned problems. A purpose of the present invention is to provide a power generation system, a driving method for the power generation system, and a combustor which can drive the gas turbine in a stable state even when different kinds of fuels are supplied to the combustor at the time of driving the power generation system.

Solution to Problem

According to a first aspect of the present invention in order to achieve the above purpose, there is provided a power generation system, wherein exhausted fuel gas exhausted from a fuel cell is used as a fuel of a combustor of a gas turbine, and at the same time, a part of compressed air compressed by a compressor of the gas turbine is used to drive the fuel cell, and the gas turbine includes a first combustor for burning fuel gas which is different kind from the exhausted fuel gas, a first turbine driven by combustion gas supplied from the first combustor, a second combustor for burning the exhausted fuel gas, and a second turbine shaft-coupled with the first turbine and driven by the combustion gas supplied from the second combustor.

Therefore, the exhausted fuel gas and the fuel gas are separately burned in different combustors from each other. Therefore, it is not necessary to mix the exhausted fuel gas and the fuel gas by the mixer. There is no case where the respective fuel gases are not evenly mixed and the combustion becomes unstable and where it is necessary to take measures against the thermal expansion in the mixer and the piping around the mixer due to the difference in temperature. Accordingly, the inconvenience caused by the difference in temperature of the different kinds of fuel gases can be solved.

According to a second aspect of the present invention, there is provided the power generation system according to the first aspect, including: a connecting/disconnecting unit configured to connect or disconnect a shaft coupling between the first turbine and the second turbine.

Therefore, when a connecting/disconnecting unit is not included, since the second turbine is rotated together with the first turbine in a state where the combustion gas is not supplied to the second turbine at the time of driving the first turbine, the load is applied to the first turbine. However, a situation where the load is applied to the first turbine can be prevented by having the connecting/disconnecting unit.

According to a third aspect of the present invention, there is provided the power generation system according to the first or second aspect, including: a fuel gas supply line configured to supply the fuel gas to the first combustor; an exhausted fuel gas supply line configured to supply the exhausted fuel gas to the second combustor; a fuel gas control valve configured to be provided in the fuel gas supply line; an exhausted fuel gas control valve configured to be provided in the exhausted fuel gas supply line; and a controller configured to control to close the exhausted fuel gas control valve and open the fuel gas control valve before the fuel cell is driven and control to open the exhausted fuel gas control valve after the fuel cell has been driven.

Therefore, when the gas turbine is driven, the first turbine is driven by supplying the fuel gas to a first combustor. Also, after the first turbine has been driven, the fuel cell is driven by supplying a part of the compressed air compressed by the compressor to the fuel cell. When the fuel cell is driven, the exhausted fuel gas is exhausted from the fuel cell. Therefore, the exhausted fuel gas is supplied to a second combustor. In this way, a power generation system according to the present invention separately burns the exhausted fuel gas and the fuel gas in different combustors from each other. At the same time, the power generation system can efficiently drive the fuel cell.

According to a fourth aspect of the present invention in order to achieve the above purpose, there is provided a driving method for a power generation system, including: a process for driving a first turbine by supplying fuel gas to a first combustor; a process for subsequently driving a fuel cell; and a process for subsequently driving a second turbine by supplying exhausted fuel gas to a second combustor, wherein the exhausted fuel gas exhausted from the fuel cell is used as a fuel of a combustor of a gas turbine, and at the same time, a part of compressed air compressed by a compressor of the gas turbine is used to drive the fuel cell, and the gas turbine includes the first combustor for burning fuel gas which is different kind from the exhausted fuel gas, the first turbine driven by combustion gas supplied from the first combustor, the second combustor for burning the exhausted fuel gas, and the second turbine shaft-coupled with the first turbine and driven by the combustion gas supplied from the second combustor.

Therefore, when the gas turbine is driven, the first turbine is driven by supplying the fuel gas to a first combustor. Also, after the first turbine has been driven, the fuel cell is driven by supplying a part of the compressed air compressed by the compressor to the fuel cell. When the fuel cell is driven, the exhausted fuel gas is exhausted from the fuel cell. Therefore, the exhausted fuel gas is supplied to a second combustor. In this way, a driving method for the power generation system according to the present invention separately burns the exhausted fuel gas and the fuel gas in different combustors from each other. Therefore, it is not necessary to mix the exhausted fuel gas and the fuel gas by the mixer. There is no case where the respective fuel gases are not evenly mixed and the combustion becomes unstable and where it is necessary to take measures against the thermal expansion in the mixer and the piping around the mixer due to the difference in temperature. Accordingly, the inconvenience caused by the difference in temperature of the different kinds of fuel gases can be solved. In addition, a driving method for the power generation system according to the present invention separately burns the exhausted fuel gas and the fuel gas in different combustors from each other. At the same time, the driving method for the power generation system can efficiently drive the fuel cell.

According to a fifth aspect of the present invention, there is provided the driving method for the power generation system according to the fourth aspect, including: a connecting/disconnecting unit configured to connect or disconnect a shaft coupling between the first turbine and the second turbine; a process for disconnecting the shaft coupling between the first turbine and the second turbine by the connecting/disconnecting unit; a process for subsequently driving the first turbine by supplying the fuel gas to the first combustor; a process for subsequently driving the fuel cell; a process for subsequently connecting the shaft coupling between the first turbine and the second turbine by the connecting/disconnecting unit; and a process for subsequently driving the second turbine by supplying the exhausted fuel gas to the second combustor.

Therefore, when a connecting/disconnecting unit is not included, since the second turbine is rotated together with the first turbine in a state where the combustion gas is not supplied to the second turbine at the time of driving the first turbine, the load is applied to the first turbine. However, a situation where the load is applied to the first turbine can be prevented by having the connecting/disconnecting unit.

According to a sixth aspect of the present invention in order to solve the above purpose, there is provided a power generation system including: a controller configured to control to close a first main nozzle control valve and open a second main nozzle control valve when a gas turbine is started and control to open the first main nozzle control valve and restrict the second main nozzle control valve when a fuel cell is started after the gas turbine has been driven, wherein exhausted fuel gas exhausted from the fuel cell is used as a fuel of a combustor of the gas turbine, and the combustor includes a first main nozzle, a second main nozzle, a first main nozzle fuel line which is connected to the first main nozzle and sends the exhausted fuel gas exhausted from the fuel cell, a second main nozzle fuel line which is connected to the second main nozzle and sends a fuel gas different kind from the exhausted fuel gas, the first main nozzle control valve provided in the first main nozzle fuel line, and the second main nozzle control valve provided in the second main nozzle fuel line.

Therefore, when the gas turbine is started, the gas turbine is started by supplying the fuel gas to the combustor. Also, after the gas turbine has been started, the fuel cell is started by supplying a part of the compressed air compressed by the compressor to the fuel cell. When the fuel cell is started, the exhausted fuel gas is exhausted from the fuel cell. The exhausted fuel gas is supplied to the combustor, and at the same time, a predetermined amount of the fuel gas of which a flow rate is restricted is supplied. In this way, the heat input shortage of the exhausted fuel gas is supplemented. Therefore, the power generation system can drive the gas turbine in a stable state. In addition, since the high-temperature exhausted fuel gas and the low-temperature fuel gas are respectively supplied from the first and second main nozzles and are burned, the mixer for mixing the exhausted fuel gas and the fuel gas having different temperatures from each other and supplying it to the combustor can be omitted.

According to a seventh aspect of the present invention, there is provided the power generation system according to the sixth aspect, wherein the combustor includes a pilot nozzle, a pilot nozzle fuel line which is connected to the pilot nozzle and sends the fuel gas, and a pilot nozzle control valve provided in the pilot nozzle fuel line, and the controller controls to open the pilot nozzle control valve when the gas turbine is started and driven.

Therefore, when the gas turbine is started and driven, the fuel gas injected from a pilot nozzle is burned. According to this, flame holding can be performed to perform stable combustion of the premixed gas in which the exhausted fuel gas and the fuel gas respectively injected from the first main nozzle and the second main nozzle is mixed with the compressed air.

According to an eighth aspect of the present invention in order to solve the above problem, there is provided a driving method for a power generation system including: a process for injecting fuel gas from only a second main nozzle when a gas turbine is started; and a process for injecting exhausted fuel gas from a first main nozzle and injecting the fuel gas restricted by a predetermined amount from the second main nozzle at the same time when a fuel cell is started after the gas turbine has been started, wherein the exhausted fuel gas exhausted from the fuel cell is used as a fuel of a combustor of the gas turbine, and the combustor includes the first main nozzle for injecting the exhausted fuel gas exhausted from the fuel cell and the second main nozzle for injecting the fuel gas which is different kind from the exhausted fuel gas.

Therefore, when the gas turbine is started, the gas turbine is started by injecting the fuel gas from the second main nozzle of the combustor and burning it. Also, after the gas turbine has been started, the fuel cell is started by supplying a part of the compressed air compressed by the compressor to the fuel cell. When the fuel cell is started, the exhausted fuel gas exhausted from the fuel cell is injected from the first main nozzle of the combustor, and at the same time, a predetermined amount of the fuel gas which supplements the heat input shortage of the exhausted fuel gas is injected from the second main nozzle. Therefore, the power generation system can drive the gas turbine in a stable state. In addition, since the high-temperature exhausted fuel gas and the low-temperature fuel gas are separately supplied from the first and second main nozzles and are burned, the mixer for mixing the exhausted fuel gas and the fuel gas having different temperatures from each other and supplying it to the combustor can be omitted.

According to a ninth aspect of the present invention in order to achieve the purpose, there is provided a combustor included in a power generation system having a fuel cell and a gas turbine, including: a first main nozzle configured to inject exhausted fuel gas exhausted from the fuel cell; a second main nozzle configured to inject fuel gas which is different kind from the exhausted fuel gas; a first main nozzle control valve configured to control injection of the exhausted fuel gas from the first main nozzle; and a second main nozzle control valve configured to control injection of the fuel gas from the second main nozzle, wherein combustion gas in which the exhausted fuel gas exhausted from the fuel cell is burned and supplied to the gas turbine.

Therefore, when the gas turbine is started, the gas turbine is started by opening a second main nozzle control valve, injecting the fuel gas from the second main nozzle, and burning it. Also, after the gas turbine has been started, the fuel cell is started by supplying a part of the compressed air compressed by the compressor of the gas turbine to the fuel cell. When the fuel cell is started, the first main nozzle control valve is opened and the exhausted fuel gas exhausted from the fuel cell is injected from the first main nozzle and burned, and at the same time, a predetermined amount of the fuel gas of which the flow rate is restricted by the second main nozzle control valve is injected. Accordingly, the heat input shortage of the exhausted fuel gas is supplemented. Therefore, the power generation system can drive the gas turbine in a stable state. In addition, since the high-temperature exhausted fuel gas and the low-temperature fuel gas are respectively supplied from the first and second main nozzles and are burned, the mixer for mixing the exhausted fuel gas and the fuel gas having different temperatures from each other and supplying it to the combustor can be omitted.

According to a tenth aspect of the present invention, there is provided the combustor according to the ninth aspect, further including: a pilot nozzle configured to inject the fuel gas; and a pilot nozzle control valve configured to control injection of the fuel gas from the pilot nozzle.

Therefore, when the gas turbine is started and driven, the pilot nozzle control valve is opened and the fuel gas injected from a pilot nozzle is burned. According to this, flame holding can be performed to perform stable combustion of the premixed gas in which the exhausted fuel gas and the fuel gas respectively injected from the first main nozzle and the second main nozzle is mixed with the compressed air.

Advantageous Effects of Invention

According to the present invention, the inconvenience caused by the difference in temperature of the different kinds of fuel gases can be solved.

According to the present invention, when the power generation system is driven, the gas turbine can be driven in a stable state even when different kinds of fuels are supplied to the combustor.

BRIEF DESCRIPTION OF DRAWINGS

FIG. 2 is a timing diagram of the power generation system according to the first embodiment at the time of driving.

DESCRIPTION OF EMBODIMENTS

First Embodiment

Preferred embodiments of a power generation system and operating method for a fuel cell in the power generation system according to the present invention will be described below in detail with reference to the drawings. The present invention is not limited to the embodiments. Also, when there is a plurality of embodiments, the present invention includes a combination of the plurality of embodiments.

The power generation system according to the first embodiment is the Triple Combined Cycle (registered trademark) in which a solid oxide fuel cell (refers to as "SOFC" below), a gas turbine, and a steam turbine are combined. The Triple Combined Cycle can generate the power in three stages, i.e., the SOFC, the gas turbine, and the steam turbine, by placing the SOFC on the side of the upstream of a gas turbine combined cycle power generation (GTCC). Therefore, an extremely high power generation efficiency can be realized. In the description below, the solid oxide fuel cell is applied as the fuel cell of the present invention. However, the fuel cell is not limited to this type.

Figure 1:
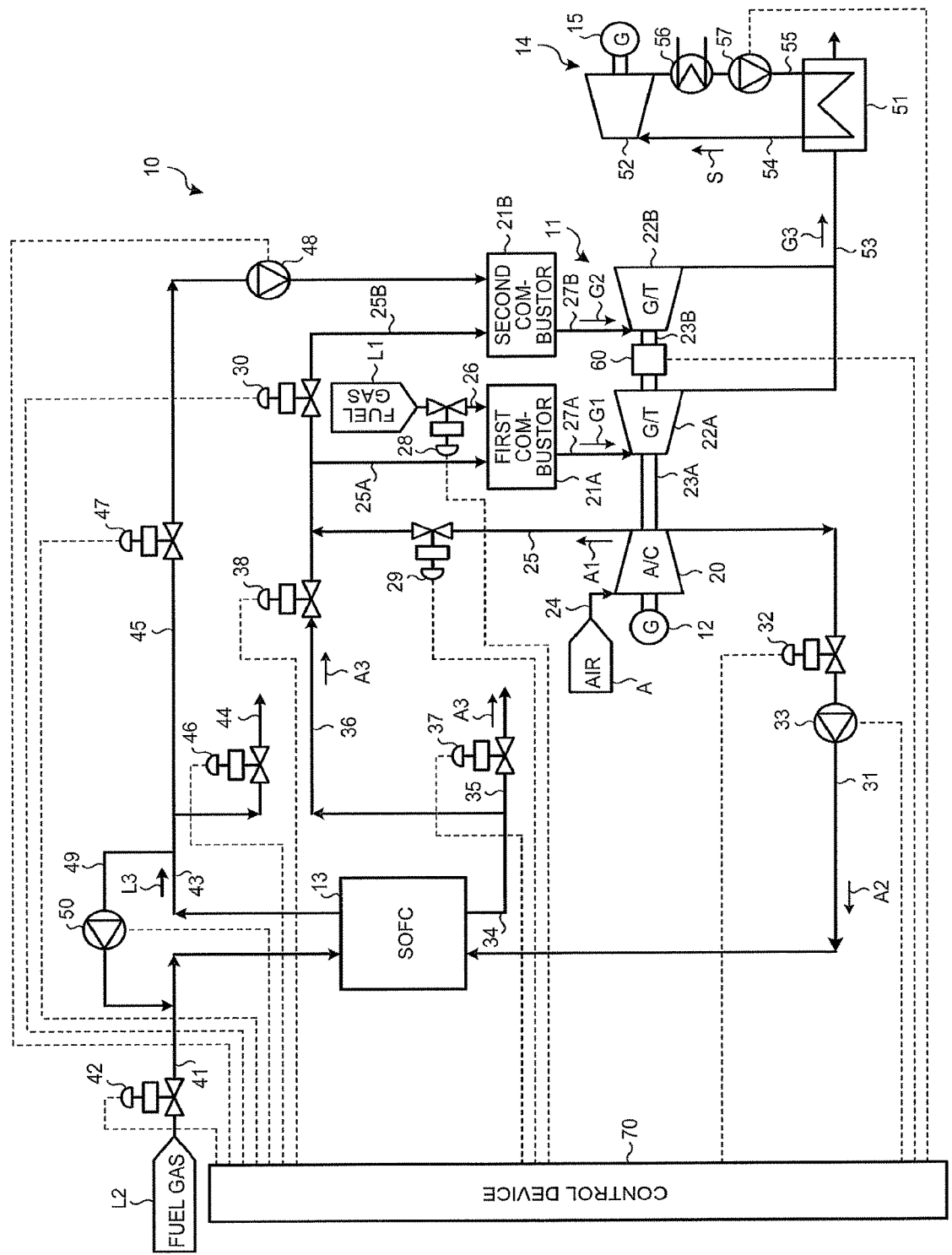
FIG. 1 is a schematic block diagram of a power generation system according to a first embodiment of the present invention.

FIG. 1 is a schematic block diagram of the power generation system according to the first embodiment of the present invention. FIG. 2 is a timing diagram of the power generation system according to the first embodiment at the time of driving.

In the first embodiment, as illustrated in FIG. 1, a power generation system 10 includes a gas turbine 11, a generator 12, a SOFC 13, a steam turbine 14, and a generator 15. The power generation system 10 can obtain a high power generation efficiency by combining power generation by the gas turbine 11, power generation by the SOFC 13, and power generation by the steam turbine 14.

The gas turbine 11 has a compressor 20, a first combustor 21A, a second combustor 21B, a first turbine 22A, and a second turbine 22B.

The compressor 20 compresses air A taken from an air intake line 24. The compressor 20 is shaft-coupled with the first turbine 22A via a rotation shaft 23A, and the compressor 20 and the first turbine 22A can be integrally rotated.

The first combustor 21A is coupled with the compressor 20 via a first compressed air supply line 25 and a first compressed air supply branch line 25A which is one of two lines branched from the first compressed air supply line 25. Then, compressed air A1 is supplied to the first combustor 21A from the compressor 20. Also, fuel gas L1 is supplied to the first combustor 21A through a first fuel gas supply line 26. The first fuel gas supply line (fuel gas supply line) 26 has a first fuel gas control valve (fuel gas control valve) 28 provided therein. The first fuel gas control valve 28 can adjust an amount of air to be supplied. The first combustor 21A mixes the compressed air A1 with the fuel gas L1 and burns it. Here, for example, liquefied natural gas (LNG) is used as the fuel gas L1 to be supplied to the first combustor 21A. The second combustor 21B is coupled with the compressor 20 via the first compressed air supply line 25 and a first compressed air supply branch line 25B which is another one of the two lines branched from the first compressed air supply line 25. Then, the compressed air A1 is supplied from the compressor 20 to the second combustor 21B. Also, exhausted fuel gas L3 is supplied to the second combustor 21B through an exhausted fuel gas supply line 45 to be described below. The second combustor 21B mixes the compressed air A1 with the exhausted fuel gas L3 and burns it. The first compressed air supply line 25 has a first compressed air control valve 29 provided therein which can adjust the amount of air to be supplied. Also, in the another first compressed air supply branch line 25B, a first compressed air branch control valve 30 is provided which can adjust the amount of air to be supplied.

The first turbine 22A is rotated by combustion gas G1 supplied from the first combustor 21A through a first combustion gas supply line 27A. The second turbine 22B is rotated by combustion gas G2 supplied from the second combustor 21B through a second combustion gas supply line 27B. The first turbine 22A and the second turbine 22B are shaft-coupled by a rotation shaft 23B so as to be integrally rotated. The rotation shaft 23B and the rotation shaft 23A are coaxially arranged. Also, a connecting/disconnecting unit 60 for connecting/disconnecting the shaft coupling between the first turbine 22A and the second turbine 22B is provided on the rotation shaft 23B arranged between the first turbine 22A and the second turbine 22B. The connecting/disconnecting unit 60 may be a clutch.

The compressor 20, the first turbine 22A, and the second turbine 22B are coaxially provided in the generator 12, and the generator 12 can generate the power by rotating the first turbine 22A and the second turbine 22B.

The high-temperature fuel gas as a reducing agent and high-temperature air (oxidizing gas) as an oxidant are supplied to the SOFC 13 so that they react at a predetermined operating temperature and the SOFC 13 generates the power. In the SOFC 13, an air electrode, a solid electrolyte, and a fuel electrode are contained in a pressure vessel. Compressed air A2 compressed by the compressor 20 is supplied to the air electrode, and the fuel gas L2 is supplied to the fuel electrode. According to this, the power is generated. Here, for example, liquefied natural gas (LNG), hydrocarbon gas such as hydrogen ($H_2$), carbon monoxide (CO), and methane ($CH_4$), and gas produced by a gasification facility of a carbonaceous material such as coals are used as the fuel gas L2 to be supplied to the SOFC 13. Also, the oxidizing gas to be supplied to the SOFC 13 is gas including about 15% to 30% oxygen. Typically, the air is preferred. However, mixed gas of flue gas and the air, mixed gas of oxygen and the air, and the like other than the air can be used (the oxidizing gas supplied to the SOFC 13 will be referred to as "air" below).

The SOFC 13 is coupled with the compressor 20 via a second compressed air supply line 31, and a part of the compressed air A2 compressed by the compressor 20 can be supplied to an introduction unit of the air electrode. In the second compressed air supply line 31, a second compressed air control valve 32 which can adjust the amount of the air to be supplied and a compressed air blower 33 which can boost the compressed air A2 are provided along a flow direction of the compressed air A2. The second compressed air control valve 32 is provided on the side of the upstream in the flow direction of the compressed air A2 in the second compressed air supply line 31, and the compressed air blower 33 is provided on the side of the downstream of the second compressed air control valve 32. The SOFC 13 is coupled with an air exhaust line 34 for exhausting the compressed air A3 used by the air electrode. The air exhaust line 34 is branched into two lines, i.e., an exhausting line 35 and a compressed air circulation line 36. The exhausting line 35 exhausts the compressed air A3 used by the air electrode to the outside. The compressed air circulation line 36 is coupled to the first compressed air supply line 25 in a front side of a branch point of the first compressed air supply branch lines 25A and 25B. A compressed air exhaust control valve 37 which can adjust the amount of the air to be exhausted is provided in the exhausting line 35. A compressed air circulation control valve 38 which can adjust the amount of circular air is provided in the compressed air circulation line 36.

Also, in the SOFC 13, a second fuel gas supply line 41 for supplying the fuel gas L2 to the introduction unit of the fuel electrode is provided. The second fuel gas supply line 41 has a second fuel gas control valve 42 provided therein. The second fuel gas control valve 42 can adjust the amount of the fuel gas to be supplied. The SOFC 13 is coupled with an exhausted fuel line 43 for exhausting the exhausted fuel gas L3 used by the fuel electrode. The exhausted fuel line 43 is branched into an exhausting line 44 for exhausting the exhausted fuel gas L3 to the outside and the exhausted fuel gas supply line 45 coupled with the second combustor 21B. An exhausted fuel gas exhaust control valve 46 which can adjust the amount of the fuel gas to be exhausted is provided in the exhausting line 44. An exhausted fuel gas control valve 47 which can adjust the amount of the fuel gas to be supplied and an exhausted fuel gas blower 48 which can boost the exhausted fuel gas L3 are provided in the exhausted fuel gas supply line 45 along the flow direction of the exhausted fuel gas L3. The exhausted fuel gas control valve 47 is provided on the side of the upstream in the flow direction of the exhausted fuel gas L3 in the exhausted fuel gas supply line 45. The exhausted fuel gas blower 48 is provided on the side of the downstream of the exhausted fuel gas control valve 47 in the flow direction of the exhausted fuel gas L3.

Also, a fuel gas re-circulation line 49 for coupling the exhausted fuel line 43 with the second fuel gas supply line 41 is provided. In the fuel gas re-circulation line 49, a re-circulation blower 50 for recirculating the exhausted fuel gas L3 in the exhausted fuel line 43 to the second fuel gas supply line 41 is provided.

A turbine 52 is rotated by steam generated by a heat recovery steam generator (HRSG) 51 in the steam turbine 14. A steam supply line 54 and a water supply line 55 are provided between the steam turbine 14 (turbine 52) and the heat recovery steam generator 51. A steam condenser 56 and a water supply pump 57 are provided in the water supply line 55. The heat recovery steam generator 51 is coupled with a flue gas line 53 from the gas turbine 11 (first turbine 22A and second turbine 22B). Steam S is generated by exchanging heat between high-temperature flue gas G3 supplied from the flue gas line 53 and water supplied from the water supply line 55. The generator 15 and the turbine 52 are coaxially provided, and the power can be generated by rotating the turbine 52. The heat is recovered from the flue gas G3 by the heat recovery steam generator 51. The flue gas G3 is released to the atmosphere after harmful substances have been removed from the flue gas G3.

A driving method (driving procedure) for the power generation system 10 according to the first embodiment will be described with reference to FIGS. 1 and 2. When the power generation system 10 is driven, the gas turbine 11, the steam turbine 14, and the SOFC 13 are driven in this order. A control device (controller) 70 generally controls the drive of the power generation system 10.

First, the control device 70 opens the first fuel gas control valve 28 of the first fuel gas supply line 26 and the first compressed air control valve 29 of the first compressed air supply line 25, and at the same time, disconnects the connecting/disconnecting unit 60. Then, the control device 70 closes other control valves 30, 32, 37, 38, 42, 46, and 47 and stops the water supply pump 57 and the blowers 33, 48, and 50. That is, in the gas turbine 11, air A is compressed by the compressor 20, and the compressed air A1 and the fuel gas L1 are mixed together and burned by the first combustor 21A. Also, in the gas turbine 11, the first turbine 22A is rotated by the combustion gas G1. The first turbine 22A reaches the rated load, and the generator 12 starts to generate the power.

Subsequently, the control device 70 drives the water supply pump 57. That is, in the steam turbine 14, the turbine 52 is rotated by the steam S generated by the heat recovery steam generator 51, and accordingly, the generator 15 starts to generate the power.

Subsequently, in a state where the compressed air exhaust control valve 37 of the exhausting line 35 and the compressed air circulation control valve 38 of the compressed air circulation line 36 are closed and the compressed air blower 33 of the second compressed air supply line 31 is stopped, the control device 70 opens the second compressed air control valve 32 of the second compressed air supply line 31 by a predetermined opening. A part of the compressed air A2 compressed by the compressor 20 is supplied from the second compressed air supply line 31 to the side of the SOFC 13. According to this, the supply of the compressed air A2 increases a pressure on the side of the air electrode of the SOFC 13. That is, in order to drive the SOFC 13, pressurization on the SOFC 13 is started by supplying the compressed air A2 from the compressor 20, and at the same time, heating is started.

On the other hand, in a state where the exhausted fuel gas exhaust control valve 46 of the exhausting line 44 and the exhausted fuel gas control valve 47 of the exhausted fuel gas supply line 45 are closed and the exhausted fuel gas blower 48 is stopped, the control device 70 opens the second fuel gas control valve 42 of the second fuel gas supply line 41, and at the same time, drives the re-circulation blower 50 of the fuel gas re-circulation line 49. Then, the fuel gas L2 is supplied from the second fuel gas supply line 41 to the SOFC 13, and at the same time, the exhausted fuel gas L3 is recirculated by the fuel gas re-circulation line 49. According to this, the supply of the fuel gas L2 increases a pressure on the side of the SOFC 13. That is, the fuel gas L2 is supplied to the side of the fuel electrode of the SOFC 13, and pressurization is started.

An inlet pressure of the compressed air A1 in the first combustor 21A becomes an outlet pressure of the compressor 20, and a pressure on the side of the air electrode of the SOFC 13 becomes the outlet pressure of the compressor 20, and accordingly, the pressures are equalized. At this time, the control device 70 fully opens the second compressed air control valve 32 and drives the compressed air blower 33 at the same time. Concurrently, the control device 70 opens the compressed air exhaust control valve 37 and exhausts the compressed air A3, which is supplied from the SOFC 13, from the exhausting line 35. Then, the compressed air A2 is supplied to the side of the SOFC 13 by the compressed air blower 33. Concurrently, the control device 70 stops the re-circulation blower 50 and opens the exhausted fuel gas exhaust control valve 46. Then, the exhausted fuel gas L3 from the SOFC 13 is exhausted from the exhausting line 44. When the pressure on the side of the air electrode and the pressure on the side of the fuel electrode in the SOFC 13 reaches a target pressure, the pressurization of the SOFC 13 is completed.

After that, when reaction (power generation) of the SOFC 13 becomes stable and components, temperatures, and pressure of the compressed air A3 and the exhausted fuel gas L3 become stable (constant), the control device 70 closes the first compressed air control valve 29 and the compressed air exhaust control valve 37 and opens the compressed air circulation control valve 38. Then, the compressed air A3 from the SOFC 13 is supplied from the compressed air circulation line 36 to the first combustor 21A through the first compressed air supply branch line 25A. That is, the first turbine 22A is rotated by the combustion gas G1 burned in the first combustor 21A by using the compressed air A3 from the SOFC 13.

In addition, the control device 70 connects the connecting/disconnecting unit 60 and closes the exhausted fuel gas exhaust control valve 46. Also, the control device 70 opens the first compressed air branch control valve 30 of the first compressed air supply branch line 25B and the exhausted fuel gas control valve 47 and drives the exhausted fuel gas blower 48. Then, the exhausted fuel gas L3 from the SOFC 13 is supplied from the exhausted fuel gas supply line 45 to the second combustor 21B, and at the same time, the compressed air A3 from the SOFC 13 is supplied to the second combustor 21B. That is, the second turbine 22B is rotated by the combustion gas G2 burned in the second combustor 21B by using the compressed air A3 from the SOFC 13 and the exhausted fuel gas L3 from the SOFC 13.

All the three power generations are performed, i.e., power generation by the generator 12 by driving the first turbine 22A and the second turbine 22B in the gas turbine 11, power generation by the SOFC 13, and power generation by the generator 15 by driving the steam turbine 14. Accordingly, the power generation system 10 performs a steady operation.

It is not necessary to provide the connecting/disconnecting unit 60. In this case, the first turbine 22A is constantly shaft-coupled with the second turbine 22B. When the combustion gas G2 is not supplied to the second turbine 22B at the time of driving the first turbine 22A, the second turbine 22B and the first turbine 22A are rotated together.

In this way, in the power generation system 10 according to the first embodiment, the exhausted fuel gas L3 exhausted from the SOFC 13 is used as a fuel of the combustor of the gas turbine 11, and at the same time, a part of the compressed air A2 compressed by the compressor 20 of the gas turbine 11 is used to drive the SOFC 13. The gas turbine 11 includes the first combustor 21A for burning the fuel gas L1 which is different kind from the exhausted fuel gas L3, the first turbine 22A driven by the combustion gas G1 supplied from the first combustor 21A, the second combustor 21B for burning the exhausted fuel gas L3, and the second turbine 22B shaft-coupled with the first turbine 22A and driven by the combustion gas G2 supplied from the second combustor 21B.

Therefore, the power generation system 10 according to the first embodiment separately burns the exhausted fuel gas L3 and the fuel gas L1 in different combustors 21A and 21B. Therefore, it is not necessary to mix the exhausted fuel gas L3 and the fuel gas L1 by the mixer. There is no case where the respective fuel gases L3 and L1 are not evenly mixed and the combustion becomes unstable and where it is necessary to take measures against the thermal expansion in the mixer and the piping around the mixer due to the difference in temperature. Accordingly, the inconvenience caused by the difference in temperature of the different kinds of the fuel gases L3 and L1 can be solved.

Also, the power generation system 10 according to the first embodiment includes the connecting/disconnecting unit 60 for connecting/disconnecting a shaft coupling between the first turbine 22A and the second turbine 22B.

Therefore, when the connecting/disconnecting unit 60 is not included, since the second turbine 22B is rotated together with the first turbine 22A in a state where the combustion gas G2 is not supplied to the second turbine 22B at the time of driving only the first turbine 22A, the load is applied to the first turbine 22A. However, a situation where the load is applied to the first turbine 22A can be prevented by having the connecting/disconnecting unit 60.

Also, the power generation system 10 according to the first embodiment includes the first fuel gas supply line (fuel gas supply line) 26 for supplying the fuel gas L1 to the first combustor 21A, the exhausted fuel gas supply line 45 for supplying the exhausted fuel gas L3 to the second combustor 21B, the first fuel gas control valve (fuel gas control valve) 28 provided in the first fuel gas supply line 26, the exhausted fuel gas control valve 47 provided in the exhausted fuel gas supply line 45, and the control device (controller) 70 for performing control to close the exhausted fuel gas control valve 47 and open the first fuel gas control valve 28 before the SOFC 13 is driven and control to open the exhausted fuel gas control valve 47 after the SOFC 13 has been driven.

Therefore, when the gas turbine 11 is driven, the first turbine 22A is driven by supplying the fuel gas L1 to the first combustor 21A. Also, after the first turbine 22A has been driven, a part of the compressed air A2 compressed by the compressor 20 is supplied to the SOFC 13, and the SOFC 13 is driven. When the SOFC 13 is driven, since the exhausted fuel gas L3 is exhausted from the SOFC 13, the exhausted fuel gas L3 is supplied to the second combustor 21B. In this way, the power generation system 10 according to the first embodiment separately burns the exhausted fuel gas L3 and the fuel gas L1 respectively in the different combustors 21A and 21B. At the same time, the power generation system 10 can efficiently drive the SOFC 13.

Also, the driving method for the power generation system 10 according to the first embodiment uses the exhausted fuel gas L3 exhausted from the SOFC 13 as a fuel of the combustor of the gas turbine 11 and uses a part of the compressed air A2 compressed by the compressor 20 of the gas turbine 11 to drive the SOFC 13. In the driving method for the power generation system 10, the gas turbine 11 includes the first combustor 21A for burning the fuel gas L1 which is a different kind from the exhausted fuel gas L3, the first turbine 22A driven by the combustion gas G1 supplied from the first combustor 21A, the second combustor 21B for burning the exhausted fuel gas L3, and the second turbine 22B shaft-coupled with the first turbine 22A and driven by the combustion gas G2 supplied from the second combustor 21B. The driving method for the power generation system 10 includes a process for supplying the fuel gas L1 to the first combustor 21A and driving the first turbine 22A, a process for subsequently driving the SOFC 13, and a process for subsequently supplying the exhausted fuel gas L3 to the second combustor 21B and driving the second turbine 22B.

Therefore, when the gas turbine 11 is driven, the first turbine 22A is driven by supplying the fuel gas L1 to the first combustor 21A. Also, after the first turbine 22A has been driven, a part of the compressed air A2 compressed by the compressor 20 is supplied to the SOFC 13, and the SOFC 13 is driven. When the SOFC 13 is driven, since the exhausted fuel gas L3 is exhausted from the SOFC 13, the exhausted fuel gas L3 is supplied to the second combustor 21B. In this way, the driving method for the power generation system 10 according to the first embodiment separately burns the exhausted fuel gas L3 and the fuel gas L1 respectively in the different combustors 21A and 21B. Therefore, it is not necessary to mix the exhausted fuel gas L3 and the fuel gas L1 by the mixer. There is no case where the respective fuel gases L3 and L1 are not evenly mixed and the combustion becomes unstable and where it is necessary to take measures against the thermal expansion in the mixer and the piping around the mixer due to the difference in temperature. Accordingly, the inconvenience caused by the difference in temperature of the different kinds of the fuel gases L3 and L1 can be solved. In this way, the driving method for the power generation system 10 according to the first embodiment separately burns the exhausted fuel gas L3 and the fuel gas L1 respectively in the different combustors 21A and 21B. At the same time, the driving method for the power generation system 10 can efficiently drive the SOFC 13.

Also, the driving method for the power generation system 10 according to the first embodiment includes the connecting/disconnecting unit 60 for connecting/disconnecting the shaft coupling between the first turbine 22A and the second turbine 22B. The driving method for the power generation system 10 includes a process for disconnecting the shaft coupling between the first turbine 22A and the second turbine 22B by the connecting/disconnecting unit 60, a process for subsequently supplying the fuel gas L1 to the first combustor 21A and driving the first turbine 22A, a process for subsequently driving the SOFC 13, a process for subsequently connecting the shaft coupling between the first turbine 22A and the second turbine 22B by the connecting/disconnecting unit 60, and a process for subsequently supplying the exhausted fuel gas L3 to the second combustor 21B and driving the second turbine 22B.

Therefore, when the connecting/disconnecting unit 60 is not included, since the second turbine 22B is rotated together with the first turbine 22A in a state where the combustion gas G2 is not supplied to the second turbine 22B at the time of driving only the first turbine 22A, the load is applied to the first turbine 22A. However, a situation where the load is applied to the first turbine 22A can be prevented by having the connecting/disconnecting unit 60.

Second Embodiment

Preferred embodiments of a power generation system and operating method for a fuel cell in the power generation system according to the present invention will be described below in detail with reference to the drawings. The present invention is not limited to the embodiments. Also, when there is a plurality of embodiments, the present invention includes a combination of the plurality of embodiments.

The power generation system of the second embodiment is the Triple Combined Cycle (registered trademark) in which a solid oxide fuel cell (refers to as "SOFC" below), a gas turbine, and a steam turbine are combined. The Triple Combined Cycle can generate the power in three stages, i.e., the SOFC, the gas turbine, and the steam turbine, by placing the SOFC on the side of the upstream of a gas turbine combined cycle power generation (GTCC). Therefore, an extremely high power generation efficiency can be realized. In the description below, the solid oxide fuel cell is applied as the fuel cell of the present invention. However, the fuel cell is not limited to this type.

Figure 3:
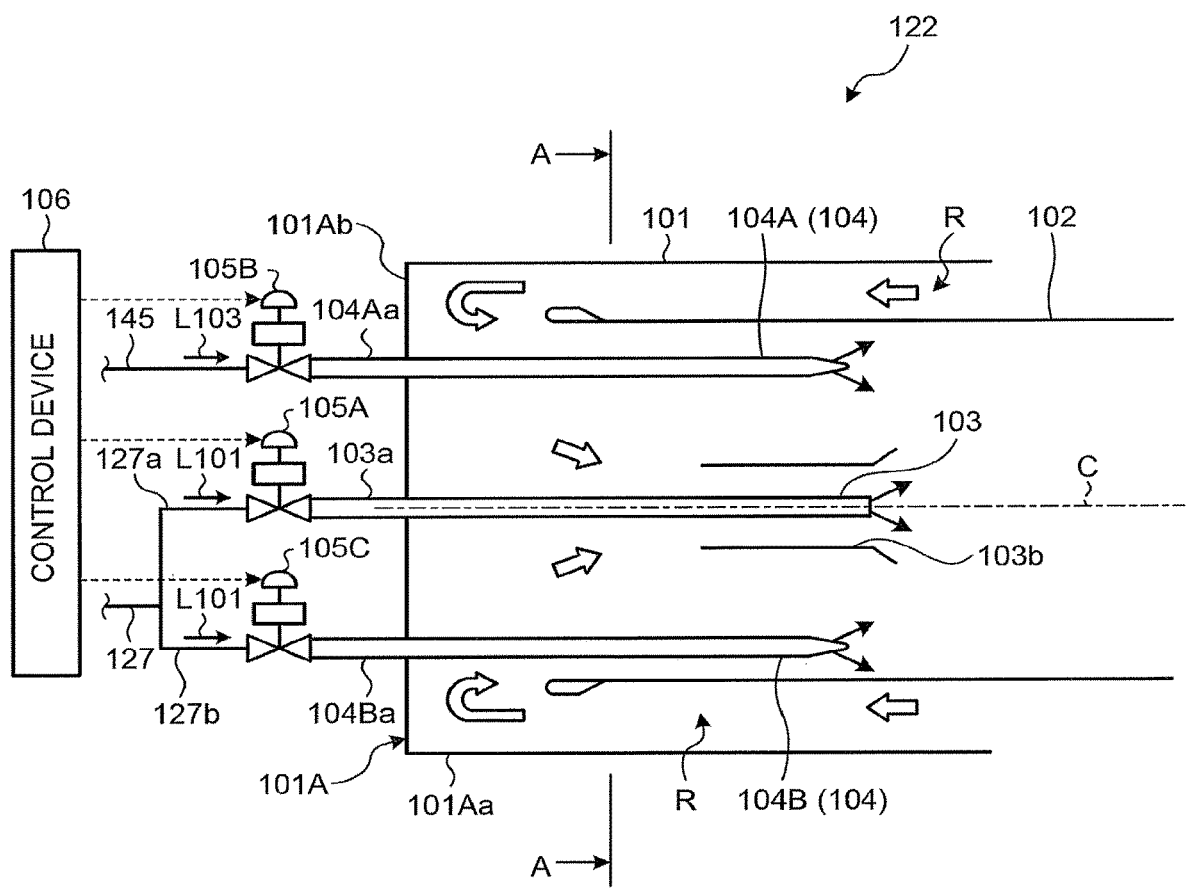
FIG. 3 is a schematic diagram of a combustor of a power generation system according to a second embodiment of the present invention.
Figure 4:
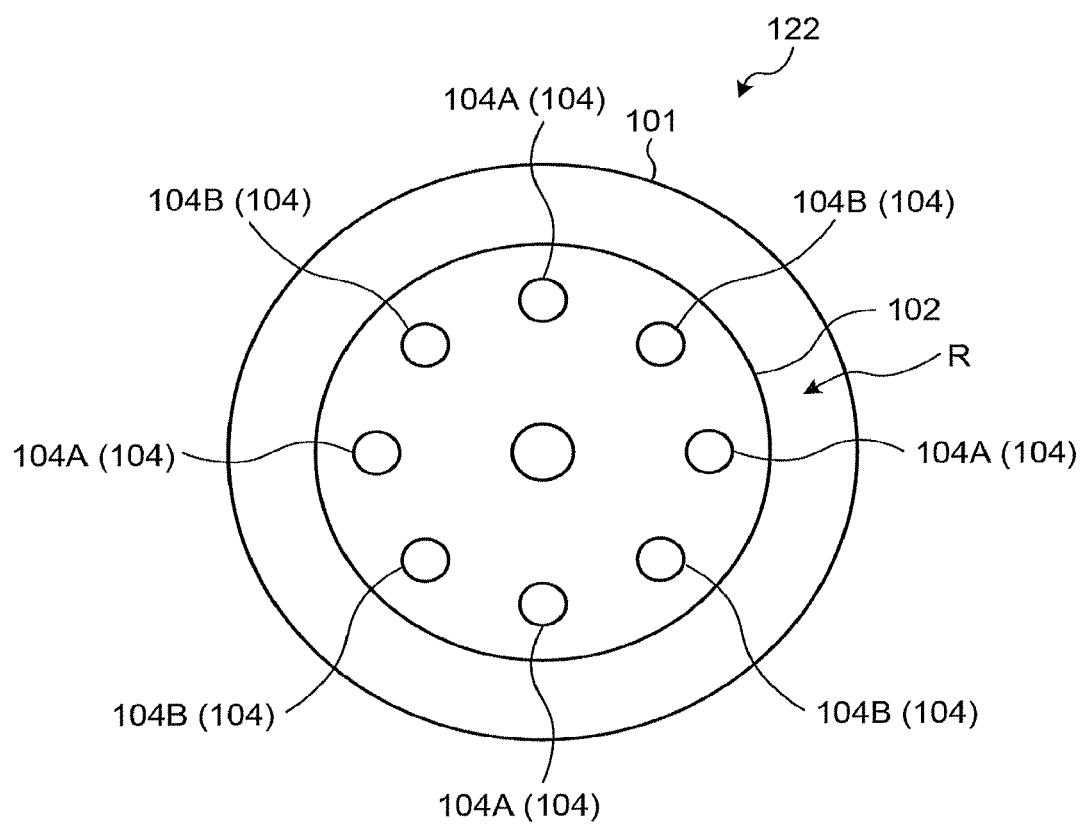
FIG. 4 is a cross-sectional diagram along the line A-A in FIG. 3.
Figure 5:
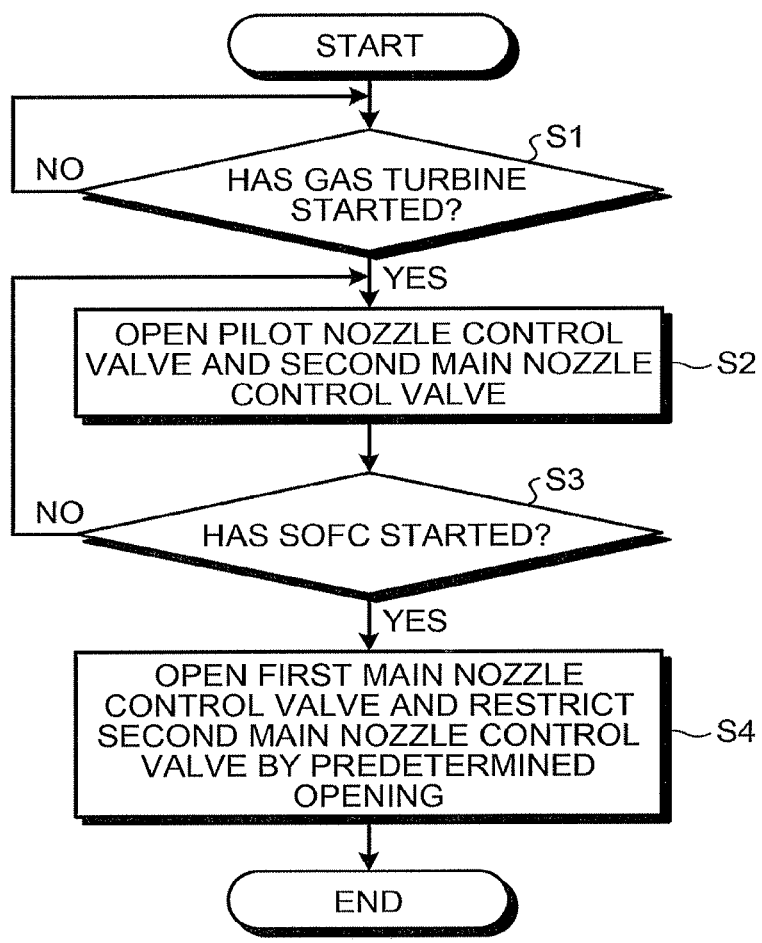
FIG. 5 is a flowchart of fuel supply in the power generation system of the second embodiment at the time of driving the combustor.
Figure 6:
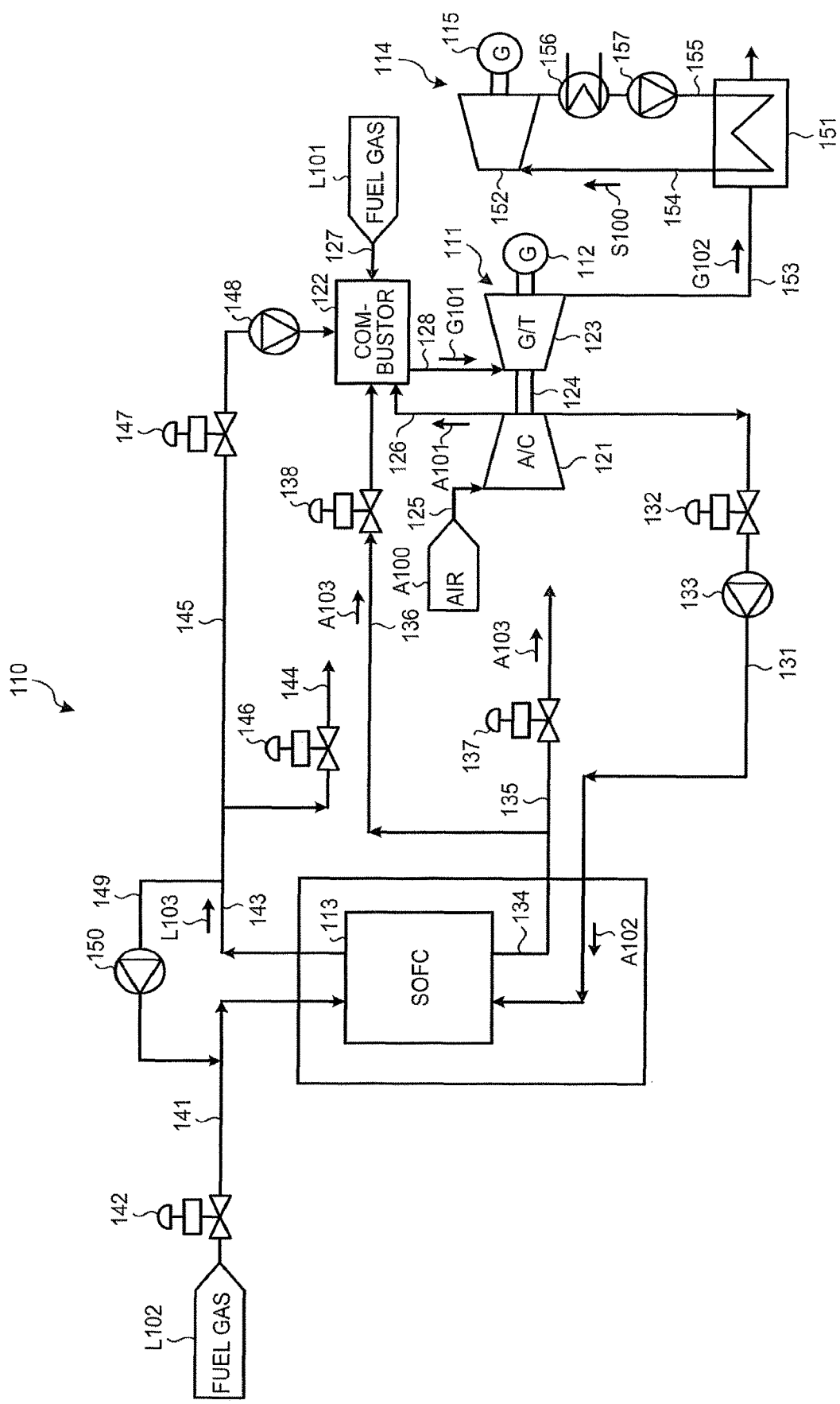
FIG. 6 is a schematic block diagram of the power generation system according to the second embodiment.

FIG. 3 is a schematic diagram of a combustor of a power generation system according to a second embodiment of the present invention. FIG. 4 is a cross-sectional diagram along the line A-A in FIG. 3. FIG. 5 is a flowchart of fuel supply in the power generation system of the second embodiment at the time of driving the combustor. FIG. 6 is a schematic block diagram of the power generation system according to the second embodiment.

In the second embodiment, as illustrated in FIG. 6, a power generation system 110 includes a gas turbine 111, a generator 112, a SOFC 113, a steam turbine 114, and a generator 115. The power generation system 110 can obtain a high power generation efficiency by combining power generation by the gas turbine 111, power generation by the SOFC 113, and power generation by the steam turbine 114.

The gas turbine 111 includes a compressor 121, a combustor 122, and a turbine 123. The compressor 121 is coupled with the turbine 123 via a rotation shaft 124, and the compressor 121 and the turbine 123 can be integrally rotated. The compressor 121 compresses air A100 taken from an air intake line 125. The combustor 122 mixes compressed air A101 supplied from the compressor 121 through a first compressed air supply line 126 with fuel gas L101 supplied from a first fuel gas supply line 127 and burns it. The turbine 123 is rotated by combustion gas G101 supplied from the combustor 122 through a fuel gas supply line 128. Although it is not shown in FIG. 6, the compressed air A101 compressed by the compressor 121 is supplied to the turbine 123 through a housing, and the turbine 123 cools a blade and the like by using the compressed air A101 as cooling air. The generator 112 and the turbine 123 are coaxially provided, and the power can be generated by rotating the turbine 123. Here, for example, liquefied natural gas (LNG) is used as the fuel gas L101 to be supplied to the combustor 122.

The high-temperature fuel gas as a reducing agent and high-temperature air (oxidizing gas) as an oxidant are supplied to the SOFC 113 so that they react at a predetermined operating temperature and the SOFC 113 generates the power. In the SOFC 113, an air electrode, a solid electrolyte, and a fuel electrode are contained in a pressure vessel. Compressed air A102 compressed by the compressor 121 is supplied to the air electrode, and the fuel gas L102 is supplied to the fuel electrode. According to this, the power is generated. Here, for example, liquefied natural gas (LNG), hydrocarbon gas such as hydrogen ($H_2$), carbon monoxide (CO), and methane ($CH_4$), and gas produced by a gasification facility of a carbonaceous material such as coals are used as the fuel gas L102 to be supplied to the SOFC 113. Also, the oxidizing gas supplied to the SOFC 113 is gas including about 15% to 30% oxygen. Typically, the air is preferred. However, mixed gas of flue gas and the air, mixed gas of oxygen and the air, and the like other than the air can be used (the oxidizing gas supplied to the SOFC 113 will be referred to as "air" below).

The SOFC 113 is coupled with a second compressed air supply line 131 branched from the first compressed air supply line 126, and a part of the compressed air A102 compressed by the compressor 121 can be supplied to an introduction unit of the air electrode. In the second compressed air supply line 131, a control valve 132 which can adjust the amount of the air to be supplied and a blower 133 which can boost the compressed air A102 are provided along a flow direction of the compressed air A102. The control valve 132 is provided on the side of the upstream in the flow direction of the compressed air A102 in the second compressed air supply line 131, and the blower 133 is provided on the side of the downstream of the control valve 132. The SOFC 113 is coupled with an air exhaust line 134 for exhausting compressed air A103 used by the air electrode. The air exhaust line 134 is branched into an exhausting line 135 for exhausting the compressed air A103 (exhaust air) used by the air electrode to the outside and a compressed air circulation line 136 coupled with the combustor 122. A control valve 137 which can adjust the amount of the air to be exhausted is provided in the exhausting line 135. A control valve 138 which can adjust the amount of circular air is provided in the compressed air circulation line 136.

Also, in the SOFC 113, a second fuel gas supply line 141 for supplying the fuel gas L102 to the introduction unit of the fuel electrode is provided. The second fuel gas supply line 141 has a control valve 142 provided therein. The control valve 142 can adjust the amount of the fuel gas to be supplied. The SOFC 113 is coupled with an exhausted fuel line 143 for exhausting the exhausted fuel gas L103 used by the fuel electrode. The exhausted fuel line 143 is branched into an exhausting line 144 for exhausting the exhausted fuel to the outside and an exhausted fuel gas supply line 145 coupled with the combustor 122. A control valve 146 which can adjust the amount of the fuel gas to be exhausted is provided in the exhausting line 144. A control valve 147 which can adjust the amount of the fuel gas to be supplied and a blower 148 which can boost the exhausted fuel gas L103 are provided in the exhausted fuel gas supply line 145 along the flow direction of the exhausted fuel gas L103. The control valve 147 is provided on the side of the upstream in the flow direction of the exhausted fuel gas L103 in the exhausted fuel gas supply line 145. The blower 148 is provided on the side of the downstream in the flow direction of the exhausted fuel gas L103 of the control valve 147.

Also, a fuel gas re-circulation line 149 for coupling the exhausted fuel line 143 with the second fuel gas supply line 141 is provided in the SOFC 113. In the fuel gas re-circulation line 149, a re-circulation blower 150 for recirculating the exhausted fuel gas L103 in the exhausted fuel line 143 to the second fuel gas supply line 141 is provided.

A turbine 152 is rotated by steam generated by a heat recovery steam generator (HRSG) 151 in the steam turbine 114. A steam supply line 154 and a water supply line 155 are provided between the steam turbine 114 (turbine 152) and the heat recovery steam generator 151. A steam condenser 156 and a water supply pump 157 are provided in the water supply line 155. The heat recovery steam generator 151 is coupled with a flue gas line 153 from the gas turbine 111 (turbine 123). Steam S100 is generated by exchanging heat between high-temperature flue gas G102 supplied from the flue gas line 153 and water supplied from the water supply line 155. The generator 115 and the turbine 152 are coaxially provided, and the power can be generated by rotating the turbine 152. The heat is recovered from the flue gas G102 by the heat recovery steam generator 151. The flue gas G102 is released to the atmosphere after harmful substances have been removed from the flue gas G102.

Here, an operation of the power generation system 110 according to the second embodiment will be described. When the power generation system 110 is started, the gas turbine 111, the steam turbine 114, and the SOFC 113 are started in this order.

First, in the gas turbine 111, the air A100 is compressed by the compressor 121, and the combustor 122 mixes the compressed air A101 and the fuel gas L101 and burns it. Also, the turbine 123 is rotated by the combustion gas G101. Accordingly, the generator 112 starts to generate the power. Next, the turbine 152 is rotated by the steam S100 generated by the heat recovery steam generator 151 in the steam turbine 114, and accord to this, the generator 115 starts to generate the power.

Subsequently, in order to start the SOFC 113, pressurization on the SOFC 113 is started by supplying the compressed air A102 from the compressor 121, and at the same time, heating is started. In a state where the control valve 137 of the exhausting line 135 and the control valve 138 of the compressed air circulation line 136 are closed and the blower 133 of the second compressed air supply line 131 is stopped, the control valve 132 is opened by a predetermined opening. A part of the compressed air A102 compressed by the compressor 121 is supplied to the side of the SOFC 113 from the second compressed air supply line 131. According to this, the supply of the compressed air A102 increases a pressure on the side of the air electrode of the SOFC 113.

On the other hand, the fuel gas L102 is supplied to the side of the fuel electrode of the SOFC 113, and pressurization is started. In a state where the control valve 146 of the exhausting line 144 and the control valve 147 of the exhausted fuel gas supply line 145 are closed and the blower 148 is stopped, the control valve 142 of the second fuel gas supply line 141 is opened, and at the same time, the re-circulation blower 150 of the fuel gas re-circulation line 149 is driven. Then, the fuel gas L102 is supplied from the second fuel gas supply line 141 to the SOFC 113, and at the same time, the exhausted fuel gas L103 is recirculated by the fuel gas re-circulation line 149. According to this, the supply of the fuel gas L102 increases a pressure on the side of the SOFC 113.

When the pressure on the side of the air electrode of the SOFC 113 becomes an outlet pressure of the compressor 121, the control valve 132 is fully opened and the blower 133 is driven. At the same time, the control valve 137 is opened, and the compressed air A103 from the SOFC 113 is exhausted from the exhausting line 135. Then, the compressed air A102 is supplied to the side of the SOFC 113 by the blower 133. At the same time, the control valve 146 is opened, and the exhausted fuel gas L103 from the SOFC 113 is exhausted from the exhausting line 144. When the pressure on the side of the air electrode and the pressure on the side of the fuel electrode in the SOFC 113 reach target pressures, the pressurization of the SOFC 113 is completed.

After that, when reaction (power generation) of the SOFC 113 becomes stable and components of the compressed air A103 and the exhausted fuel gas L103 become stable, the control valve 137 is closed and the control valve 138 is opened. Then, the compressed air A103 from the SOFC 113 is supplied from the compressed air circulation line 136 to the combustor 122. Also, the blower 148 is driven by closing the control valve 146 and opening the control valve 147. Then, the exhausted fuel gas L103 from the SOFC 113 is supplied from the exhausted fuel gas supply line 145 to the combustor 122. At this time, the fuel gas L101 supplied from the first fuel gas supply line 127 to the combustor 122 is reduced.

Here, all the three power generations are performed, i.e., power generation by the generator 112 by driving the gas turbine 111, power generation by the SOFC 113, and power generation by the generator 115 by driving the steam turbine 114. Accordingly, the power generation system 110 performs a steady operation.

The combustor 122 will be described below. The combustor 122 is arranged in the housing of the turbine 123 (not shown). The compressed air A101 compressed by the compressor 121 and the compressed air A103 exhausted from the SOFC 113 are supplied to the housing, and the combustor 122 generates the combustion gas G101 by mixing the compressed air A101, the compressed air A103, and the fuel gas L101 and burning it.

As illustrated in FIGS. 3 and 4, an inner cylinder 102 is supported in an external cylinder 101 in the combustor 122 so as to form an air passage R at a predetermined interval. The inner cylinder 102 is coupled with a transition piece (combustion gas supply line 128). A front end part of the transition piece is connected to the turbine 123.

In the inner cylinder 102, a pilot nozzle 103 is arranged on a combustor axis C, which is the central part of the inner cylinder 102, along an extending direction of the combustor axis C. The pilot nozzle 103 has a combustion chamber 103*b* mounted around the front end part thereof. The combustion chamber 103*b* has a cylindrical shape, and the side of the front end has a wider angle.

Also, in the inner cylinder 102, a plurality of (eight in the second embodiment) main nozzles 104 (also referred to as "premixing nozzle") is arranged in parallel to the combustor axis C so as to surround the pilot nozzle 103 along the circumferential direction of the inner surface in the inner cylinder 102. The main nozzles 104 include first main nozzles 104A and second main nozzles 104B. In the second embodiment, four first main nozzles 104A and four second main nozzles 104B are provided, and the first and second main nozzles 104A and 104B are alternately arranged in the circumferential direction of the inner cylinder 102.

A top hat part 101A is provided in a base end part of the external cylinder 101. The top hat part 101A includes a cylindrical member 101Aa and a lid member 101Ab. The cylindrical member 101Aa is arranged along the inner surface of the base end part of the external cylinder 101 and forms a part of the air passage R together with the external cylinder 101. The lid member 101Ab closes an opening of the cylindrical member 101Aa on the side of the base end. The lid member 101Ab supports the above-mentioned pilot nozzle 103, and a fuel port 103*a* of the pilot nozzle 103 is arranged outside the lid member 101Ab. The fuel port 103*a* is connected to a pilot nozzle fuel line 127*a* branched from the first fuel gas supply line 127, the fuel gas L101 is supplied to the pilot nozzle 103. Also, the lid member 101Ab supports the above-mentioned first main nozzle 104A and second main nozzle 104B, and a fuel port 104Aa of the first main nozzle 104A and a fuel port 104Ba of the second main nozzle 104B are arranged outside the lid member 101Ab. The fuel port 104Aa of the first main nozzle 104A is connected to the exhausted fuel gas supply line 145 as a first main nozzle fuel line, and the exhausted fuel gas L103 is supplied to the first main nozzle 104A. Also, the fuel port 104Ba of the second main nozzle 104B is connected to a second main nozzle fuel line 127*b* branched from the first fuel gas supply line 127, and the fuel gas L101 is supplied to the second main nozzle 104B.

Also, a pilot nozzle control valve 105A for controlling the supply of the fuel gas L101 to the pilot nozzle 103 is provided in the pilot nozzle fuel line 127*a*. Also, a first main nozzle control valve 105B for controlling the supply of the exhausted fuel gas L103 to the first main nozzle 104A is provided in the exhausted fuel gas supply line 145. Also, a second main nozzle control valve 105C for controlling the supply of the fuel gas L101 to the second main nozzle 104B is provided in the second main nozzle fuel line 127*b*.

In this combustor 122, when high-temperature and high-pressure compressed air A101 and compressed air A103 flow into the air passage R from the top end side of the external cylinder 101, the compressed air A101 and the compressed air A103 return at a position of the top hat part 101A on the side of the base end of the external cylinder 101 and flow into the inner cylinder 102. In the inner cylinder 102, the fuel gas L101 and the exhausted fuel gas L103 injected from the main nozzles 104 (104A and 104B) are mixed with the compressed air A101 and the compressed air A103 for flowing into the inner cylinder 102, and they become the premixed gas. The premixed gas flows into the transition piece on the side of the top end of the inner cylinder 102. Also, in the inner cylinder 102, the fuel gas L101 injected from the pilot nozzle 103 is mixed with the compressed air A101 and the compressed air A103 for flowing into the inner cylinder 102, and it is ignited by a pilot light which is not shown and burned. Then, the combustion gas G101 is generated and injected into the transition piece. At this time, a part of the combustion gas G101 is injected into the transition piece with flame so as to be diffused to the circumference. According to this, the premixed gas flowing from each main nozzle 104 into the transition piece is ignited and burned. The generated combustion gas G101 is supplied to the turbine 123.

In the combustor 122, a control device (controller) 106 controls to open/close of the respective control valves 105A, 105B, and 105C and controls the opening of the valves. The control device 106 controls the respective control valves 105A, 105B, and 105C according to start up and an operation state of the gas turbine 111 and an operation state of the SOFC 113. Therefore, the control device 106 inputs operation states of the gas turbine 111 and the SOFC 113 and continuously monitors them.

A driving method for the power generation system 110 according to the second embodiment which is the control by the above-mentioned control device 106 will be described below. Here, the drive of the gas turbine 111 in a case where the gas turbine 111, the steam turbine 114, and the SOFC 113 are started in this order will be described.

First, in a stopped state before the gas turbine 111 is started, the control device 106 closes the pilot nozzle control valve 105A, the first main nozzle control valve 105B, and the second main nozzle control valve 105C.

As illustrated in FIG. 5, when an instruction to start the gas turbine 111 has been received (step S1: Yes), the control device 106 controls to open the pilot nozzle control valve 105A and the second main nozzle control valve 105C (step S2). The fuel gas L101 is injected from the pilot nozzle 103 by the combustor 122, and the fuel gas L101 is injected from the second main nozzle 104B. Then, the combustor 122 mixes the fuel gas L101 with the compressed air A101 and generates the combustion gas. Accordingly, the gas turbine 111 is started by the combustion gas G101 generated from the fuel gas L101.

After that, a part of the compressed air A102 compressed by the compressor 121 of the gas turbine 111 is supplied to the SOFC 113, and the fuel gas L102 is supplied to the SOFC 113. Accordingly, the SOFC 113 is started. When a signal indicating that the SOFC 113 has been started has been input (step S3: Yes), the control device 106 controls to open the first main nozzle control valve 105B and to restrict the second main nozzle control valve 105C by a predetermined opening while opening the pilot nozzle control valve 105A (step S4). Then, in the combustor 122, the exhausted fuel gas L103 is injected from the first main nozzle 104A, and the combustion gas G101 is generated. The predetermined opening of the second main nozzle control valve 105C is an opening to supplement shortage of the heat input by the exhausted fuel gas L103 relative to the heat input in which the gas turbine 111 reaches the rated load with the heat input by supplying the fuel gas L101. According to this, when the exhausted fuel gas L103 is exhausted from the SOFC 113 after the SOFC 113 has been started, the gas turbine 111 is mainly driven by the exhausted fuel gas L103. Before the signal indicating that the SOFC 113 has been started is input in step S3 (step S3: No), the control device 106 opens the pilot nozzle control valve 105A and the second main nozzle control valve 105C in step S2. The combustor 122 generates the combustion gas G101 by the fuel gas L101 injected from the pilot nozzle 103. That is, the gas turbine 111 is driven by the combustion gas G101 generated by the fuel gas L101 before the SOFC 113 is started.

In this way, the power generation system 110 uses the exhausted fuel gas L103 to be exhausted from the SOFC 113 as a fuel of the combustor 122 of the gas turbine 111. The power generation system 110 according to the second embodiment includes the combustor 122, the first main nozzle 104A, the second main nozzle 104B, the exhausted fuel gas supply line (first main nozzle fuel line) 145 which is connected to the first main nozzle 104A and sends the exhausted fuel gas L103 exhausted from the SOFC 113, the second main nozzle fuel line 127b which is connected to the second main nozzle 104B and sends the fuel gas L101 different from the exhausted fuel gas L103, the first main nozzle control valve 105B provided in the exhausted fuel gas supply line 145, and the second main nozzle control valve 105C provided in the second main nozzle fuel line 127b. The power generation system 110 also includes the control device 106 which controls to close the first main nozzle control valve 105B and to open the second main nozzle control valve 105C when the gas turbine 111 is started and controls to open the first main nozzle control valve 105B and to strict the second main nozzle control valve 105C when the SOFC 113 is started after the gas turbine 111 has been started.

Therefore, when the gas turbine 111 is started, the gas turbine 111 is started by supplying the fuel gas L101 to the combustor 122. Also, after the gas turbine 111 has been started, a part of the compressed air A102 compressed by the compressor 121 is supplied to the SOFC 113, and the SOFC 113 is started. When the SOFC 113 is started, the exhausted fuel gas L103 is exhausted from the SOFC 113. The exhausted fuel gas L103 is supplied to the combustor 122, and at the same time, a predetermined amount of the fuel gas L101 of which a flow rate is restricted is supplied. In this way, the heat input shortage of the exhausted fuel gas L103 is supplemented. Therefore, the power generation system 110 according to the second embodiment can drive the gas turbine 111 in a stable state. In addition, since high-temperature (about 450° C.) exhausted fuel gas L103 and low-temperature (about 15° C.) fuel gas L101 are separately supplied from the first main nozzle 104A and the second main nozzle 104B and burned, a mixer for mixing the exhausted fuel gas L103 with the fuel gas L101 having different temperatures from each other and supplying it to the combustor 122 can be omitted.

Also, in the power generation system 110 according to the second embodiment, the combustor 122 includes the pilot nozzle 103, the pilot nozzle fuel line 127a which is connected to the pilot nozzle 103 and sends the fuel gas L101, and the pilot nozzle control valve 105A provided in the pilot nozzle fuel line 127a. The control device 106 controls to open the pilot nozzle control valve 105A when starting or driving the gas turbine 111.

Therefore, when the gas turbine 111 is started and driven, the fuel gas L101 injected from the pilot nozzle 103 is burned. According to this, flame holding can be performed to perform stable combustion of the premixed gas in which the exhausted fuel gas L103 and the fuel gas L101 respectively injected from the first main nozzle 104A and the second main nozzle 104B is mixed with the compressed air.

Also, in the driving method for the power generation system 110 according to the second embodiment, the exhausted fuel gas L103 exhausted from the SOFC 113 is used as a fuel of the combustor 122 of the gas turbine 111. The combustor 122 includes the first main nozzle 104A for injecting the exhausted fuel gas L103 exhausted from the SOFC 113 and the second main nozzle 104B for injecting the fuel gas L101 which is a different kind from the exhausted fuel gas L103. The driving method for the power generation system 110 includes a process for injecting the fuel gas L101 from the second main nozzle 104B when the gas turbine 111 is started and a process for injecting the exhausted fuel gas L103 from the first main nozzle 104A and injecting the fuel gas L101 restricted by a predetermined amount from the second main nozzle 104B when the SOFC 113 is started after the gas turbine 111 has been started.

Therefore, when the gas turbine 111 is started, the gas turbine 111 is started by injecting the fuel gas L101 from the second main nozzle 104B of the combustor 122 and burning it. Also, after the gas turbine 111 has been started, a part of the compressed air A102 compressed by the compressor 121 is supplied to the SOFC 113, and the SOFC 113 is started. When the SOFC 113 is started, the exhausted fuel gas L103 exhausted from the SOFC 113 is injected from the first main nozzle 104A of the combustor 122, and at the same time, a predetermined amount of the fuel gas L101 which supplements the heat input shortage of the exhausted fuel gas L103 is injected from the second main nozzle 104B. Therefore, the power generation system 110 according to the second embodiment can drive the gas turbine 111 in a stable state. In addition, since high-temperature (about 450° C.) exhausted fuel gas L103 and low-temperature (about 15° C.) fuel gas L101 are separately supplied from the first main nozzle 104A and the second main nozzle 104B and burned, a mixer for mixing the exhausted fuel gas L103 with the fuel gas L101 having different temperatures from each other and supplying it to the combustor 122 can be omitted.

Also, the combustor 122 according to the second embodiment, which is included in the power generation system 110 having the SOFC 113 and the gas turbine 111, supplies the combustion gas in which the exhausted fuel gas L103 exhausted from the SOFC 113 is burned to the gas turbine 111. The combustor 122 includes the first main nozzle 104A for injecting the exhausted fuel gas L103 exhausted from the SOFC 113, the second main nozzle 104B for injecting the fuel gas L101 which is different kind from the exhausted fuel gas L103, the first main nozzle control valve 105B for controlling injection of the exhausted fuel gas L103 from the first main nozzle 104A, and the second main nozzle control valve 105C for controlling injection of the fuel gas L101 from the second main nozzle 104B.

Therefore, when the gas turbine 111 is started, the gas turbine 111 is started by opening the second main nozzle control valve 105C, injecting the fuel gas L101 from the second main nozzle 104B, and burning it. Also, after the gas turbine 111 has been started, a part of the compressed air A102 compressed by the compressor 121 of the gas turbine 111 is supplied to the SOFC 113, and the SOFC 113 is started. When the SOFC 113 is started, the first main nozzle control valve 105B is opened and the exhausted fuel gas L103 exhausted from the SOFC 113 is injected from the first main nozzle 104A and burned, and at the same time, a predetermined amount of the fuel gas L101 of which the flow rate is restricted by the second main nozzle control valve 105C is injected. Accordingly, the heat input shortage of the exhausted fuel gas L103 is supplemented. Therefore, the power generation system 110 according to the second embodiment can drive the gas turbine 111 in a stable state. In addition, since high-temperature (about 450° C.) exhausted fuel gas L103 and low-temperature (about 15° C.) fuel gas L101 are separately supplied from the first main nozzle 104A and the second main nozzle 104B and burned, a mixer for mixing the exhausted fuel gas L103 with the fuel gas L101 having different temperatures from each other and supplying it to the combustor 122 can be omitted.

Also, the combustor 122 according to the second embodiment further includes the pilot nozzle 103 for injecting the fuel gas L101 and the pilot nozzle control valve 105A for controlling the injection of the fuel gas L101 from the pilot nozzle 103.

Therefore, when the gas turbine 111 is started and driven, the fuel gas L101 injected from the pilot nozzle 103 is burned by opening the pilot nozzle control valve 105A. Accordingly, the flame holding can be performed to perform the stable combustion of the premixed gas in which the exhausted fuel gas L103 and the fuel gas L101 respectively injected from the first main nozzle 104A and the second main nozzle 104B are mixed with the compressed air.

REFERENCE SIGNS LIST 10 power generation system
11 gas turbine
12 generator
13 SOFC (fuel cell)
14 steam turbine
15 generator
20 compressor
21A first combustor
21B second combustor
22A first turbine
22B second turbine
26 first fuel gas supply line (fuel gas supply line)
28 first fuel gas control valve (fuel gas control valve)
45 exhausted fuel gas supply line
47 exhausted fuel gas control valve
60 connecting/disconnecting unit
70 control device
103 pilot nozzle
104A first main nozzle
104B second main nozzle
105A pilot nozzle control valve
105B first main nozzle control valve
105C second main nozzle control valve
106 control device (controller)
110 power generation system
111 gas turbine
113 SOFC (solid oxide fuel cell: fuel cell)
122 combustor
127a pilot nozzle fuel line
127b second main nozzle fuel line
145 exhausted fuel gas supply line (first main nozzle fuel line)
L101 fuel gas
L103 exhausted fuel gas

The invention claimed is:

1. A power generation system comprising:
a controller configured to control to close a first main nozzle control valve and open a second main nozzle control valve when a gas turbine is started and control to open the first main nozzle control valve and restrict the second main nozzle control valve when a fuel cell is started after the gas turbine has been driven,
wherein:
a combustor of the gas turbine is configured to use exhausted fuel gas exhausted from the fuel cell as a fuel; and
the combustor includes:
a first main nozzle;
a second main nozzle;
a first main nozzle fuel line which is connected between the first main nozzle and the fuel cell and is configured to send the exhausted fuel gas exhausted from the fuel cell; and
a second main nozzle fuel line which is connected to the second main nozzle and is configured to send a fuel gas of a different kind from the exhausted fuel gas,
wherein the first main nozzle control valve is in the first main nozzle fuel line and is configured to control supply of the exhausted fuel gas, and
wherein the second main nozzle control valve is in the second main nozzle fuel line.

2. The power generation system according to claim 1, wherein:
the combustor further includes a pilot nozzle, a pilot nozzle fuel line which is connected to the pilot nozzle and is configured to send the fuel gas, and a pilot nozzle control valve in the pilot nozzle fuel line; and
the controller is configured to control to open the pilot nozzle control valve when the gas turbine is started and driven.

* * * * *